(12) United States Patent
Dong et al.

(10) Patent No.: US 7,151,574 B2
(45) Date of Patent: Dec. 19, 2006

(54) OPTIMIZED STRUCTURE FOR DIGITAL SEPARATION OF COMPOSITE VIDEO SIGNALS

(75) Inventors: Ping Dong, Cupertino, CA (US); Jordan C. Cookman, Palo Alto, CA (US)

(73) Assignee: ESS Technology, Inc., Fremont, CA (US)

( * ) Notice: Subject to any disclaimer, the term of this patent is extended or adjusted under 35 U.S.C. 154(b) by 483 days.

(21) Appl. No.: 10/725,955

(22) Filed: Dec. 1, 2003

(65) Prior Publication Data

US 2005/0117065 A1    Jun. 2, 2005

(51) Int. Cl.
*H04N 9/77* (2006.01)
(52) U.S. Cl. ............... 348/663; 348/641; 348/727; 348/665
(58) Field of Classification Search ............... 348/663, 348/665, 669, 670, 465, 724, 726, 727, 638–642; *H04N 9/77, 9/78*
See application file for complete search history.

(56) References Cited

U.S. PATENT DOCUMENTS

| | | | |
|---|---|---|---|
| 5,654,768 A * | 8/1997 | Hatano | ............... 348/640 |
| 6,188,445 B1 | 2/2001 | Taketani | |
| 6,459,457 B1 | 10/2002 | Renner et al. | |
| 6,504,579 B1 | 1/2003 | Scherrer | |

* cited by examiner

*Primary Examiner*—Sherrie Hsia
(74) *Attorney, Agent, or Firm*—Ernest J. Beffel, Jr.; Haynes Beffel & Wolfeld LLP (57) ABSTRACT

A device and method are provided for implementing digital baseband separation of composite video signals with reduced memory requirements. The method and device require that only the composite signal be stored in a large delay element. Multiple quadrature demodulators are employed to generate multiple delayed complex baseband signals. Therefore, no large complex baseband delay element is required.

6 Claims, 5 Drawing Sheets

FIG. 1    PRIOR ART

PRIOR ART

PRIOR ART

OPTIMIZED STRUCTURE FOR DIGITAL SEPARATION OF COMPOSITE VIDEO SIGNALS

BACKGROUND

The invention relates to the field of video signal processing, and, more particularly to an improved device and method for digitally separating a composite video signal into luminance and chrominance components.

According to Grassman's laws, the human eye can distinguish three kinds of differences or variations. These three components can be represented in many ways. One common way is to represent them as intensities of red (R), green (G), and blue (B) light. They can also be represented as a single luminance (Y) component, along with two chrominance (C) components. The chrominance components can be viewed as color difference signals (B-Y, R-Y), or in polar coordinates as an angle (hue) and magnitude (saturation.)

Typically, composite video signals are generated by adding a baseband luminance signal to a quadrature modulated chrominance signal. Two commonly used standards are known as "NTSC" (developed by the National Television System Committee in the USA in 1953) and "PAL" (developed in Europe in the 1960's, employing the technique of phase-alternating lines.) There are several variations of these techniques, including the use of different line and frame frequencies and different sub-carrier frequencies used for quadrature modulation. Details of such techniques are well known and can be found in the relevant national standards, or in international standards such as ITU-R BT.470. The theory about the components of visible light and the techniques used for generation of composite video signals are also well known and can also be found in any textbook on video signal processing, such as *Digital Video and HDTV Algorithms and Interfaces*, by Charles Poynton.

Figure 1:
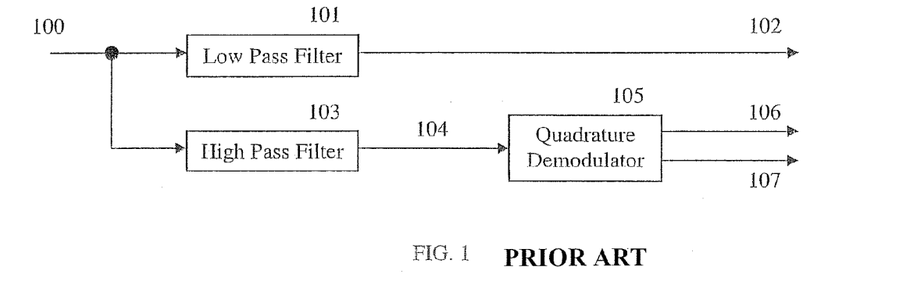
FIG. 1 is a block diagram of a conventional 1-dimensional signal separation structure.

The simplest way to separate the luminance and chrominance components of a composite video signal is to use a combination of low-pass and high-pass filters. This technique assumes that the majority of the luminance signal is below a certain frequency, while the majority of the chrominance signal is above the same frequency. Because the filters only operate in the horizontal direction of the image, this technique is considered one-dimensional. A block diagram of a device employing this technique appears in FIG. 1. The composite signal 100 goes through a low-pass filter 101 to generate the luminance signal 102. The composite signal 100 also goes through a high-pass filter 103 to generate the modulated chrominance signal 104. The modulated chrominance signal 104 is then demodulated by a quadrature demodulator 105 to form the color difference signals 106, 107.

The disadvantage of this configuration is that, in practice, there is some overlap between luminance and chrominance signals in the frequency domain. Therefore, this structure will cause some luminance information to be decoded as chrominance, and vice versa, resulting in visible artifacts in the decoded image. The restriction of the luminance bandwidth to lower frequencies also results in a lower quality image.

Another well known configuration for separating luminance and chrominance recognizes that the luminance and chrominance signals typically do not change a great deal between adjacent lines, and the chrominance subcarrier is designed to have opposite phase for either adjacent lines (NTSC) or every second line (PAL.) Thus, by averaging the composite signal for two lines, the modulated chrominance signal will cancel, leaving only the luminance signal. By taking the difference of two lines, the luminance signal will be cancelled, leaving only the chrominance signal. This type of structure is known as a comb filter, due to the resemblance of its frequency response to the teeth of a comb. Because this structure operates in both horizontal and vertical directions of the image, it is considered a two-dimensional technique. A block diagram of a structure employing a simple comb filter appears in FIG. 2. The composite signal 100 goes through a delay element 201, which delays the signal by one (NTSC) or two (PAL) lines. The delayed signal 202 goes to an adder 203, where it is added to the composite signal 100 to obtain the luminance component 204. The delayed signal 202 also goes to a second adder 205, where it is subtracted from the composite signal 100 to obtain the modulated chrominance component 206. Scale factors may be required before or after the adders to ensure that the component signals are in the correct range. The modulated chrominance signal 206 is then demodulated by a quadrature demodulator 207 to form the color difference signals 208, 209.

Figure 2:
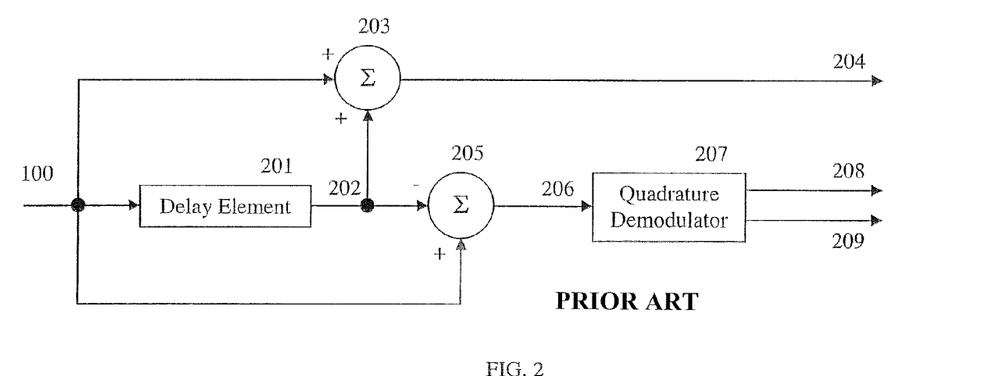
FIG. 2 is a block diagram of a conventional 2-line passband signal separation structure.

One problem with the simple comb filter structure of FIG. 2 is that the assumption that luminance and chrominance signals do not change substantially between lines is not always true. Therefore, the decoded image will have visible artifacts around horizontal (line to line) transitions. Another disadvantage of this structure is that it is sensitive to errors in the phase of the chrominance signal. If the phase of the chrominance subcarrier is not exactly opposite after the delay, it will result in imperfect cancellation of the chrominance signal.

To address the problem of horizontal transitions, more complicated signal separation devices use signal information from three or more lines, and employ a vertical processing block to detect transitions and select various combinations of the lines based on that detection. The vertical processing block may also select a horizontal filter output when an appropriate combination of lines cannot be found. An example of this type of structure can be found in UK Patent Application GB 2066615, "Improvements to Colour Television Decoding Apparatus."

Figure 3:
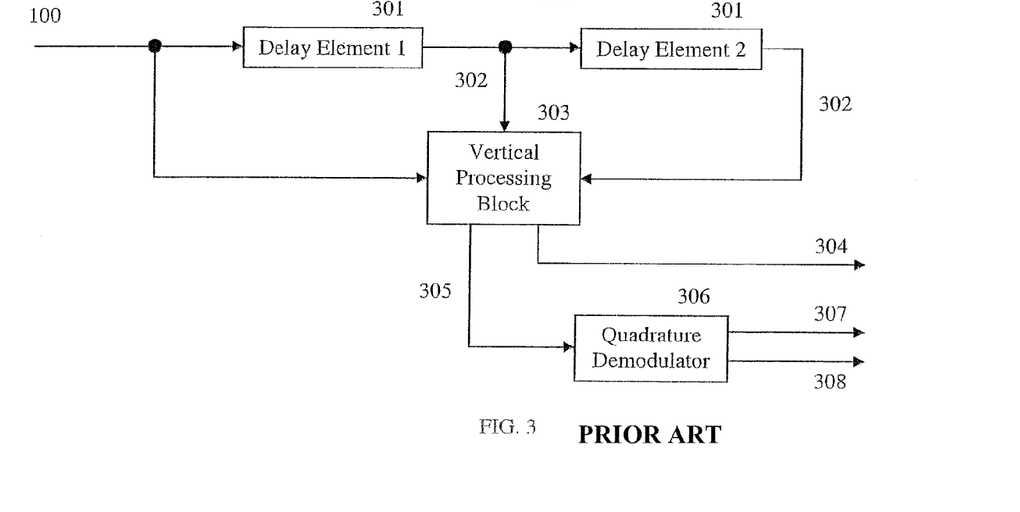
FIG. 3 is a block diagram of an enhanced conventional passband signal separation structure.

Further improvements can be realized by using signal information from multiple frames of the image. Because these structures operate in horizontal and vertical directions of the image, as well as over multiple frames, they are considered three-dimensional. Examples can be found in U.S. Pat. No. 5,473,389, "Y/C Separator Using 3-D, 2-D, and 1-D Filters," and U.S. Pat. No. 5,502,509, "Chrominance-Luminance Separation Method and Filter Performing Selective Spatial Filter Based on Detected Spatial Correlation." A generalized block diagram of the enhanced comb filter structure, which may be two-dimensional or three-dimensional depending on whether any of the delay elements store entire frames, appears in FIG. 3. Hereafter, the term "vertical processing" will be used to mean two-dimensional and/or three-dimensional processing. The composite signal 100 goes to a cascade of delay elements 301, which delay the signal by various multiples of the line or frame period, generating multiple delayed signals 302. Although only two delay elements are shown in the figure, more could be added without departing from the general structure. The delayed signals 302 and the composite signal 100 proceed to a vertical processing block 303, which determines the best combination of signals to generate luminance 304 and modulated chrominance 305 signals. The modulated chrominance signal 305 is then demodulated by a quadrature demodulator 306 to form the color difference signals 307, 308.

Figure 4:
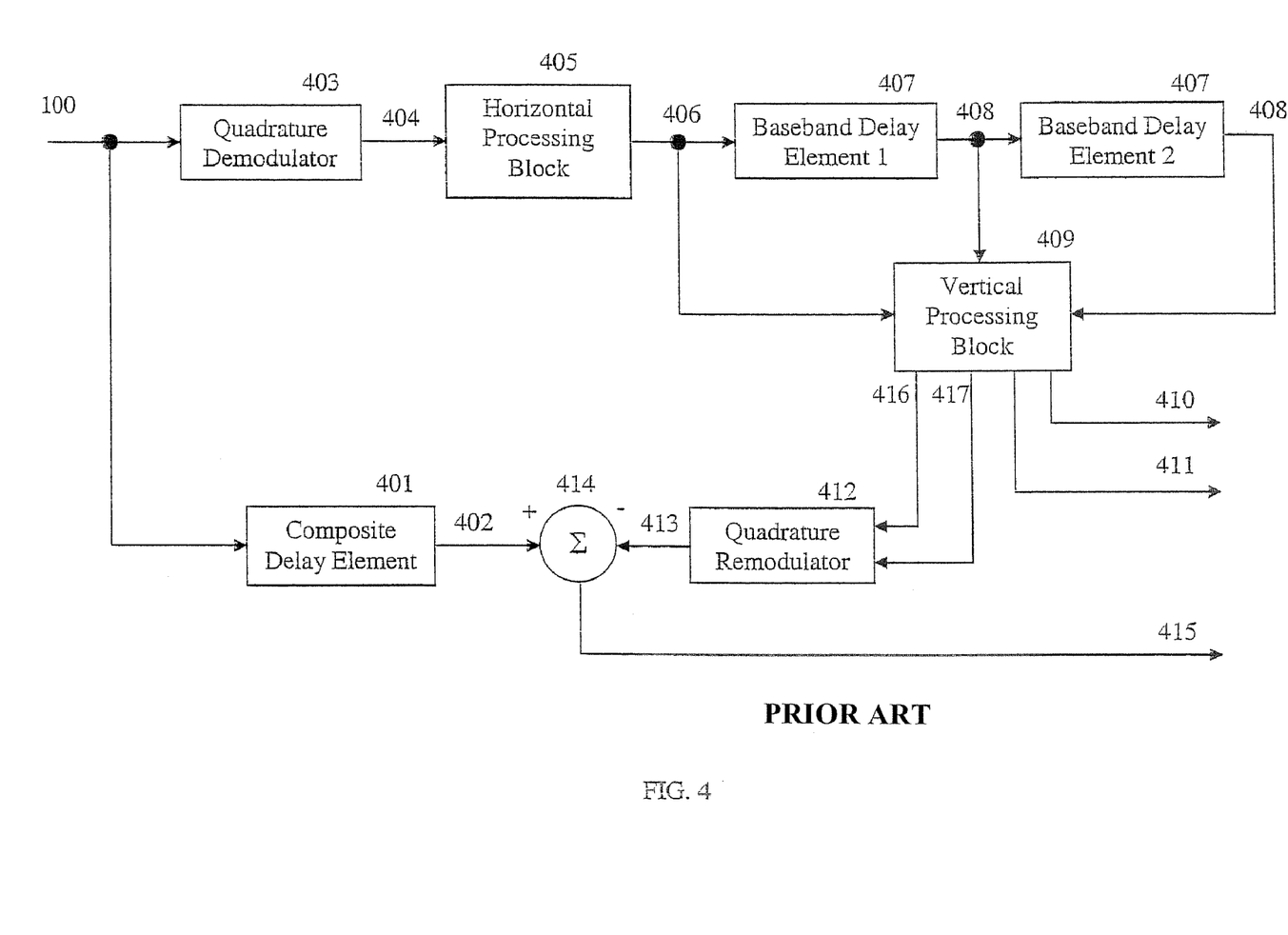
FIG. 4 is a block diagram of a conventional baseband signal separation structure.

In all of the configurations described above, the signal separation operations occur before quadrature demodulation of the chrominance signal. These can be called "passband" structures. To address the problem of subcarrier phase sensitivity, some signal separation devices perform demodulation before the vertical processing block. These can be called "baseband" structures. Examples of such structures are U.S. Pat. No. 6,052,157, "System and Method for Separating Chrominance and Luminance Components of a Color Television System;" U.S. Pat. No. 6,175,389, "Comb Filtered Signal Separation;" and U.S. Pat. No. 6,459,457, "Adaptive Color Comb Filter." A generalized block diagram of the baseband comb filter structure appears in FIG. 4. The composite signal 100 goes to a composite delay element 401, which generates a delayed composite signal 402. The composite signal 100 also goes to a quadrature demodulator 403, which generates a complex baseband signal 404. The complex baseband signal 404 goes to a horizontal processing block 405, which generates a filtered complex baseband signal 406. The filtered complex baseband signal 406 goes to a cascade of complex baseband delay elements 407, which delay the complex baseband signal by various multiples of the line or frame period, generating multiple delayed complex baseband signals 408. Although only two baseband delay elements are shown in FIG. 4, more could be added without departing from the general structure. The delayed complex baseband signals 408 and the filtered complex baseband signal 406 proceed to vertical processing block 409, which determines the best combination of signals to generate first color difference signals 410, 411 and second color difference signals 416, 417. The first color difference signals 410, 411 are used for output. The second color difference signals 416, 417 proceed to a remodulator 412, which generates a modulated chrominance signal 413. The second color difference signals 416, 417 may or may not be the same as the first color difference signals 410, 411. The modulated chrominance signal 413 goes to adder 414, which subtracts the modulated chrominance signal 413 from delayed composite signal 402 to form the luminance output 415.

The main disadvantage of this configuration is that it requires increased memory space to implement the complex baseband delay elements. Because the baseband signal is complex, it requires twice the memory as the composite signal, assuming the same precision and sampling rate requirements. This is because the composite signal has only a real part, whereas the complex baseband signal has both real and imaginary parts. This requirement may be reduced by decimating or reducing the precision of the complex baseband signal. For example, see FIG. 10 of U.S. Pat. No. 6,175,389 and the relevant description. However, both decimation and precision reduction result in the loss of signal information that may be useful for later processing. Decimation of the baseband signal also requires that interpolation be done before remodulation, increasing the complexity of the implementation.

Therefore, there exists a need in the art for an optimized signal separation structure to implement baseband signal separation with reduced memory requirements, and without loss of signal information. As will be understood below, the invention accomplishes this in an elegant manner.

SUMMARY OF THE INVENTION

A device and method are provided for implementing digital baseband separation of composite video signals with reduced memory requirements. The method and device require that only the composite signal be stored in a large delay element. Multiple quadrature demodulators are employed to generate multiple delayed complex baseband signals. Therefore, no large complex baseband delay element is required.

The invention provides an optimized composite video signal separation device that includes a delay memory for storing a composite signal, and that is configured to output multiple delayed versions of the composite signal. The device includes multiple demodulators configured to demodulate multiple demodulator input signals by a subcarrier. The device further includes a vertical signal processing block, configured to process multiple complex baseband signals, and configured to output a first separated signal. The device includes a modulator coupled to the vertical signal processing block, where the modulator is configured to modulate the first separated signal. And it further includes a subtraction device configured to subtract the modulated first separated signal from a subtraction input signal to produce a second separated signal. The subtraction input signal may consist of one delayed version of the composite signal, or a mathematical combination of multiple delayed versions of the composite signal. Optional horizontal signal processing blocks may be coupled between the delay memory and the demodulators, between the demodulators and the vertical processing block, between the delay memory and the subtraction means, or in any combination thereof.

In operation, a method for composite video signal separation includes the following steps. The first step is to obtain samples of a composite signal. Then the samples are stored in a delay memory. Next, multiple samples from the delay memory are demodulated by a subcarrier to form multiple complex baseband signals. The next step is to vertically process the multiple complex baseband signals to form a first separated signal. The first separated signal is then modulated by a subcarrier to form a remodulated signal. The final step is to subtract the remodulated signal from one of the samples of the composite signal to from a second separated signal. Instead of using one sample of the composite signal for the subtraction step, a mathematical combination of multiple samples may be used. Optional horizontal processing steps may be included before the multiple demodulations, between the demodulations and the vertical processing, before the subtraction, or in any combination thereof.

DETAILED DESCRIPTION

The invention provides a novel structure for digital baseband signal separation for a composite video signal. The invention is herein described using embodiments illustrated in the accompanying drawings, but is not limited to those embodiments. The scope of the invention is defined by the accompanying claims and any equivalents.

Figure 5:
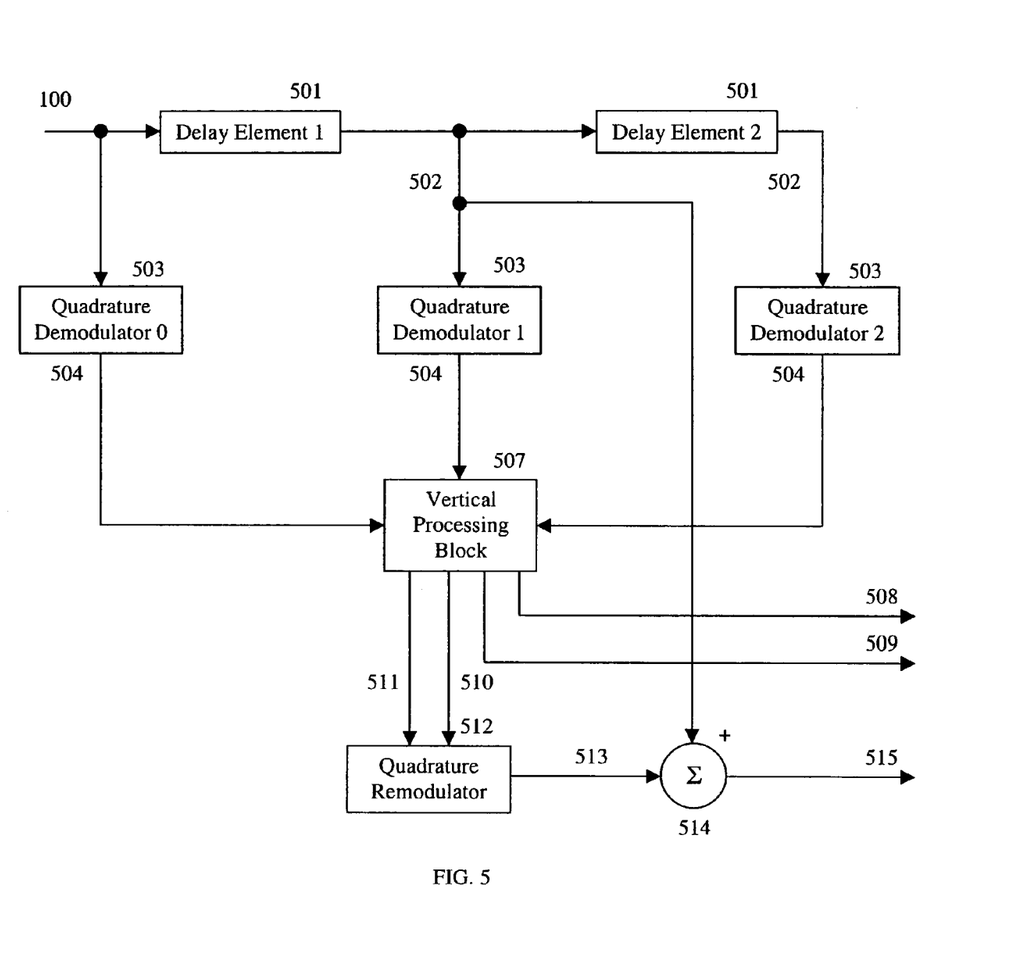
FIG. 5 is a block diagram of the optimized baseband signal separation structure of the invention.

One embodiment of the invention is illustrated in FIG. 5. The input to the device illustrated in FIG. 5 is a sampled composite signal 100. In practice, the composite signal 100 may have already been processed by one or more timing synchronization modules, decimation filters, automatic gain control modules, delay elements, or other processing blocks or combinations of processing blocks well-known in the art (not shown.). Such preliminary processing devices are optional and may be used according to particular applications. The invention, however, is not limited by such processes. The composite signal 100 proceeds to a cascade of composite delay elements 501, each of which generates a delayed composite signal 502. Though only two composite delay elements are shown in FIG. 5, more could be added without departing from the general structure. The composite delay elements process the incoming composite signal in a manner that generally delays the composite signal by an integer number of samples. The delays may also be integer multiples of lines, fields, or frames, but are not limited to such multiples. For example, the delays may be slightly more or less than integer multiples to accommodate other delays in the system. The composite delay elements may be implemented as one or more memory locations, or different storage devices. They may also be implemented in a circular or linear fashion depending on the application.

The sampled composite signal 100 and each of the delayed composite signals 502, proceed to separate quadrature demodulators 503. Although only three quadrature demodulators are shown in the figure, more could be added without departing from the general structure. Each quadrature demodulator generates a complex baseband signal 504.

The complex baseband signals 504 proceed to a vertical processing block 507, which determines the best combination of inputs to generate first color difference signals 508, 509. The vertical processing block 507 also generates second color difference signals 510, 511, which are used for remodulation. The second color difference signals 510, 511 may or may not be the same as the first color difference signals 508, 509. The second color difference signals 510, 511 proceed to a quadrature remodulator 512, which generates a modulated chrominance signal 513. The modulated chrominance signal 513 proceeds to an adder 514, which subtracts the modulated chrominance signal 513 from one of the delayed composite signals 502 to form the luminance output 515. In general, the delay between the composite signal 100 and the two adder inputs should be the same in order for the chrominance components to be effectively removed from the composite signal. However, the invention is not limited to such a relationship between said delays.

Figure 5A:
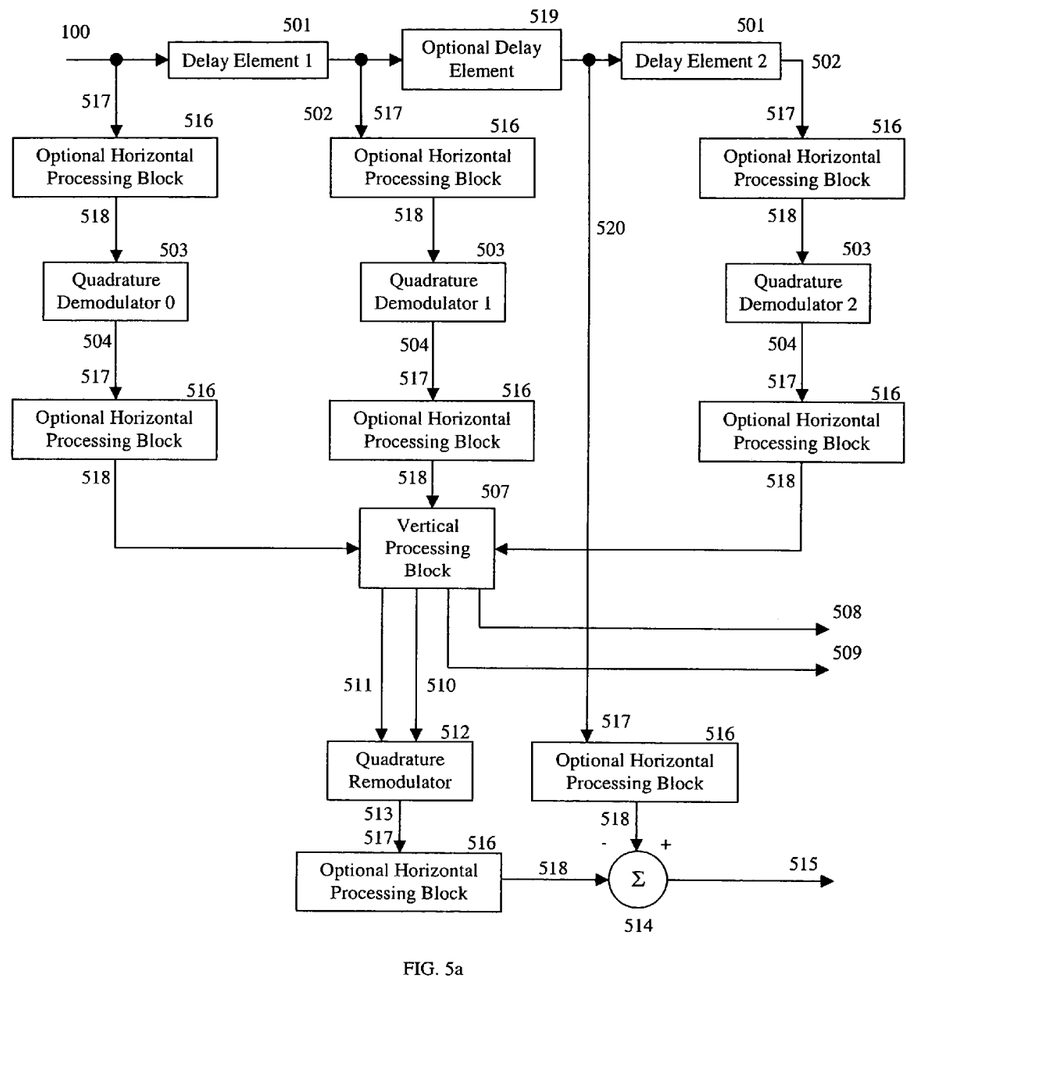

Optional horizontal processing blocks may be added to the structure in FIG. 5, without departing from the scope of the invention. Horizontal processing blocks are typically one-dimensional low-pass filters, and may be used for example to eliminate the signal image at twice the subcarrier frequency, which results from the demodulation. Horizontal processing blocks may also be used to remove the luminance components in the complex baseband signals, which are centered around the subcarrier frequency. Horizontal processing blocks may also be used to reduce the bandwidth of the chrominance components in the complex baseband signals. Horizontal processing may be used for other reasons, and may have frequency responses other than low-pass without departing from the scope of the invention. Optional horizontal processing blocks may be added before the quadrature demodulators 503, between the quadrature demodulators 503 and the vertical processing block 507, or before the adder 514. This is illustrated in FIG. 5a, where each optional horizontal processing block 516 performs horizontal processing on an input signal 517, and produces an output signal 518. To compensate the delay of the optional horizontal processing blocks, an optional delay element 519 may be added to generate a delayed composite signal 520, from which the modulated chrominance signal 513 is subtracted. The delayed composite signal 520 and the modulated chrominance signal 513 may optionally be horizontally processed before subtraction, as shown in FIG. 5a. Horizontal processing blocks that operate on different delayed versions of the composite or complex baseband signals may have different frequency responses. This is one advantage of the invention over conventional structures, where horizontal processing with a single frequency response is generally applied before storing the complex baseband signal. An embodiment of the invention in accordance with FIG. 5a may include one or more of the illustrated optional blocks; it need not include all of them. One or more optional horizontal processing blocks or delay elements may also be included in configurations not illustrated in FIG. 5a without departing from the scope of the invention. For example, an additional optional delay element could be added between the illustrated optional delay element 519 and the adder 514.

The reduced memory advantage of the invention over conventional baseband signal separators can be illustrated by an example. Suppose that a baseband signal separator is to be designed, where the vertical processing block consists of a three-line comb filter. As its name implies, a three-line comb filter needs samples from three different lines of video. If this signal separator is to be designed according to conventional structures, it requires memory to store at least two lines of the complex baseband signal. This allows the comb filter to use the current sample of the complex baseband signal, along with the sample delayed by one and two lines, for a total of three samples. The output of a three-line comb filter generally corresponds to the middle of the three lines. Therefore, the comb filter introduces an overall delay of one line between input and output. This means the composite signal must also be delayed by one line in order for the remodulation and subtraction operations to produce the correct luminance output. So, the conventional structure requires an additional memory to store one line of the composite signal.

If the same three-line comb filter is implemented using the optimized structure according to the invention, only two lines of composite signal need to be stored. Assuming the complex baseband signal requires twice the memory per line as the composite signal, the optimized structure requires only ⅖ the memory of the conventional structure. Even if the complex baseband signal is decimated or reduced in precision so that it takes the same amount of memory per line as the composite signal, the optimized structure requires only ⅔ the memory of the conventional structure. The optimized structure requires some extra circuitry to implement multiple demodulators and horizontal processing blocks, which partially offsets the savings in memory. However, in most applications, the overall implementation size will be reduced using the invention.

Figure 6:
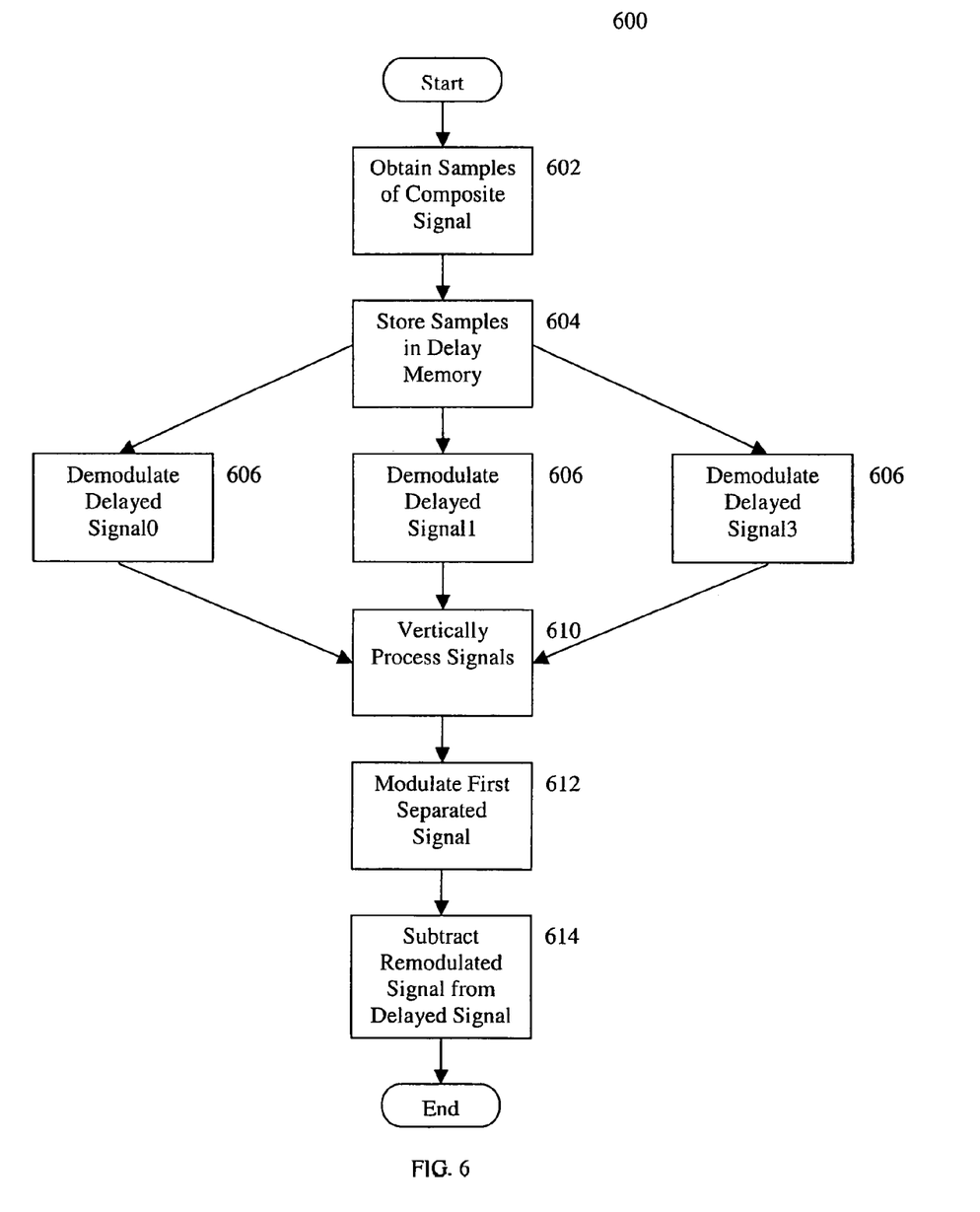
FIG. 6 is a flow diagram illustrating a method for composite video signal separation according to the invention.

Referring to FIG. 6, in operation, a method 600 for composite video signal separation performed in accordance with the invention is illustrated. The first step 602 is to obtain samples of a composite signal. Then, the samples are stored in a delay memory in step 604. Next, a plurality of samples is demodulated from the delay memory by a sub-carrier to form multiple complex baseband signals in step 606. Although only three demodulation steps are shown in the figure, more could be added without departing from the general method. The next step 610 is to vertically process the multiple complex baseband signals to form a first separated signal. In Step 612, the first separated signal is then modulated by a subcarrier to form a remodulated signal. In Step 614, the remodulated signal is subtracted from one of the samples of the composite signal to from a second separated signal. Optional horizontal processing steps may be added before the vertical processing step or other steps without departing from the scope of the invention. Horizontal processing steps are typically one-dimensional low-pass filters to remove the images of the demodulated signal, remove the luminance components from the complex baseband signals, or reduce the bandwidth of the chrominance components in the complex baseband signals before vertical processing.

As will be appreciated by those skilled in the art, there is normally a small difference between the subcarrier frequency derived from the local oscillator in a video signal processor and the subcarrier frequency used to generate the video signal. Therefore, a phase-locked loop (PLL) or similar technique is required to track the phase and frequency of the subcarrier. Composite television signals include a color burst signal designed to facilitate such tracking. Generally, the PLL or similar device only updates the phase and frequency during the color burst, and these parameters are fixed for the remainder of the line. A device or method designed according to the invention generally requires unique phase and frequency information for each of the separate demodulators, and for the remodulator. One way to meet this requirement is to store the phase and frequency information at the beginning of each line, so it can be later used when demodulating the delayed signal or performing remodulation. Since the frequency is generally fixed throughout the line, the initial phase and frequency are sufficient for the entire line. This requires some extra storage space for each line of delay, but is negligible compared to storing the demodulated signal itself. Another way to meet this requirement is to store only the phase, and assume the frequency for the delayed lines is the same as the frequency for the current line. Yet another way to meet this requirement is to extrapolate the phase for the delayed lines based on the current phase and frequency, and assume the frequency for the delayed lines is the same as the frequency for the current line. Other approaches may be possible, and the invention is not limited by the technique used to obtain the phase and frequency for the separate demodulators or the remodulator.

The invention has been described in the context of a device and method configured to optimize the process of separating a video signal. It will be appreciated by those skilled in the art that other variations in configurations and method steps may be derived without departing from the spirit and scope of the invention that is defined by the appended claims and all equivalents.

The invention claimed is:

1. A composite video signal separation device, comprising
 a delay memory configured to store a composite signal and to output a plurality of delayed versions of said composite signal;
 a plurality off demodulators coupled to said delay memory and configured to demodulate said plurality of delayed versions of said composite signal by a sub-carrier, and to generate a plurality of complex baseband signals;
 a vertical signal processing block coupled to said plurality of demodulators and configured to process said plurality of complex baseband signals and to output a first separated signal;
 a modulator coupled to said vertical signal processing block and configured to modulate said first separated signal and to generate a remodulated signal; and
 a subtractor coupled to said modulator and configured to subtract said remodulated signal from one of said plurality of delayed versions of said composite signal and to generate a second separated signal.

2. A composite video signal separation device, comprising
 a delay memory for storing a composite signal and configured to output a plurality of signals derived from said composite signal;
 a plurality of demodulators coupled to said delay memory and configured to demodulate said plurality of signals derived from said composite signal by a sub-carrier to generate a plurality of complex baseband signals;
 a vertical signal processor coupled to said plurality of and configured to process said plurality of complex baseband signals, and further configured to output a first separated signal and a second separated signal;
 a modulator coupled to said vertical signal processor and configured to modulate said first separated signal and to generate a remodulated signal; and
 a subtractor coupled to said modulator and configured to subtract said remodulated signal from one of said plurality of signals derived from said composite signal and to generate a third separated signal.

3. A composite video signal separation device, comprising
 a delay memory for storing a composite signal and configured to output a plurality of signals derived from said composite signal;
 a plurality of demodulators coupled to said delay memory and configured to demodulate said plurality of signals derived from said composite signal by a sub-carrier and to generate a plurality of demodulated signals;
 a plurality of horizontal signal processing blocks coupled to said plurality of demodulators and configured to process said plurality of demodulated signals and to generate a plurality of complex baseband signals;
 a vertical signal processor coupled to said plurality of horizontal signal processing blocks and configured to process said plurality of complex baseband signals and to output a first separated signal;
 a modulator coupled to said vertical signal processing block and configured to modulate said first separated signal, and to generate a remodulated signal; and
 a subtraction device coupled to said modulator and configured to subtract said remodulated signal from one of said plurality signals derived from said composite signal and to generate a second separated signal.

4. A method for composite video signal separation, comprising:
 obtaining samples of a composite signal;
 storing said samples in a delay memory;
 demodulating a plurality of samples from said delay memory by a subcarrier to form a plurality of complex baseband signals;
 vertically processing said plurality of complex baseband signals to form a first separated signal;

modulating said first separated signal by a subcarrier to form a remodulated signal; and subtracting said remodulated signal from one of said samples of said composite signal to form a second separated signal.

5. A method for composite video signal separation, comprising:

obtaining samples of a composite signal;

storing said samples in a delay memory;

demodulating a plurality of samples from said delay memory by a subcarrier to form a plurality of complex baseband signals;

vertically processing said plurality of complex baseband signals to form a first separated signal and a second separated signal;

modulating said first separated signal by a subcarrier to form a remodulated signal; and    subtracting said remodulated signal from one of said samples of said composite signal to form a third separated signal.

6. A method for composite video signal separation, comprising obtaining samples of a composite signal;

storing said samples in a delay memory;

demodulating a plurality of samples from said delay memory by a subcarrier to form a plurality of demodulated signals;

horizontally processing said plurality of demodulated signals to form a plurality of complex baseband signals;

vertically processing said plurality of complex baseband signals to form a first separated signal;

modulating said first separated signal by a subcarrier to form a remodulated signal; and    subtracting said remodulated signal from one of said samples of said composite signal to form a second separated signal.

* * * * *